2 Sheets--Sheet 1.
T. MAYOR.
Roving-Frame.
No. 6,302. Reissued Feb. 23, 1875.
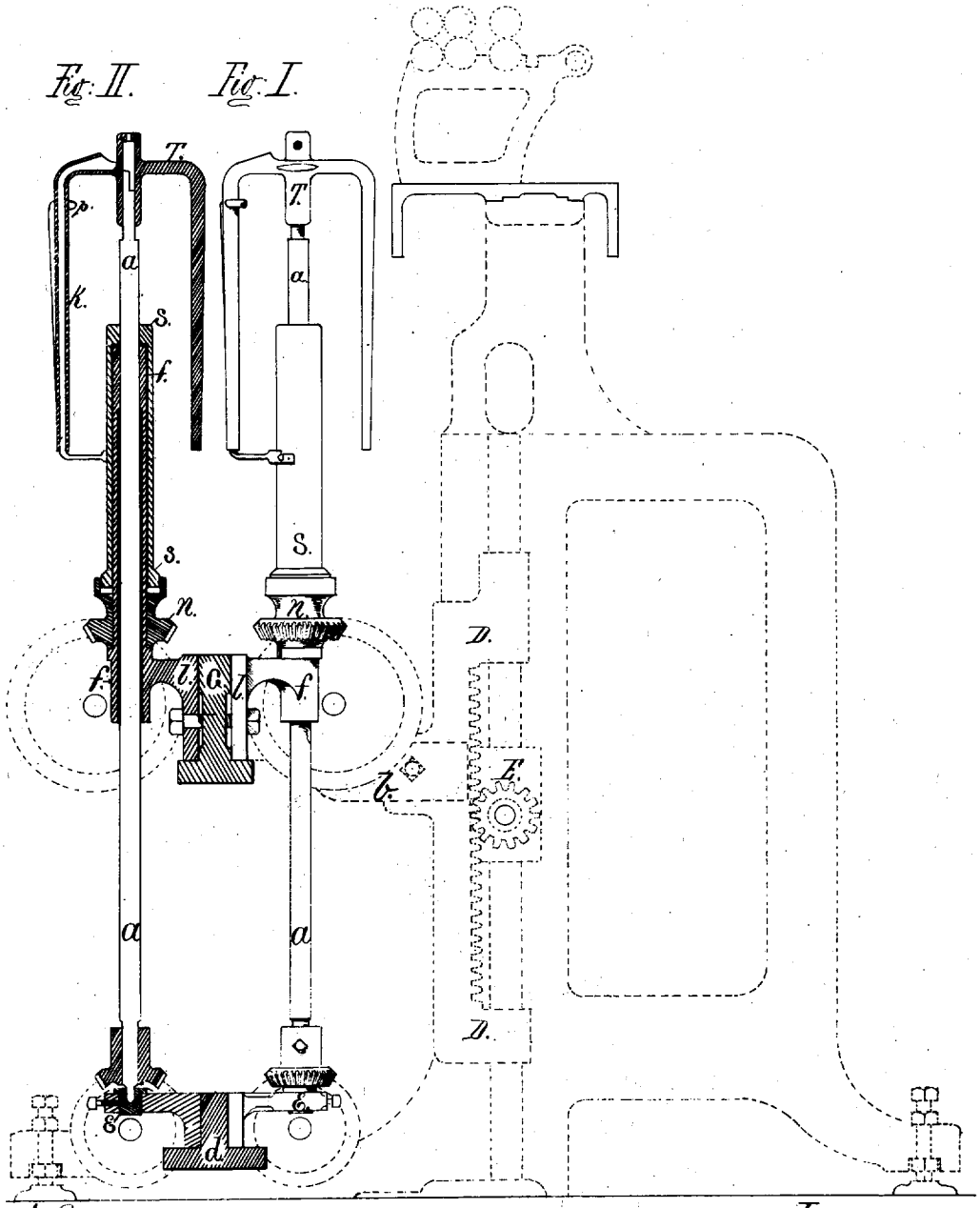
Witnesses:
L. P. Langworthy
Chas. F. Hunt
Inventor.
Thomas Mayor
by
Joseph A. Miller
his Attorney.

2 Sheets--Sheet 2.
T. MAYOR.
Roving-Frame.
No. 6,302. Reissued Feb. 23, 1875.
Fig. III
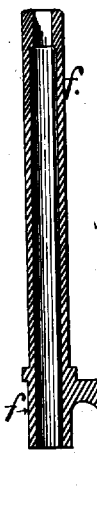
Fig. IV
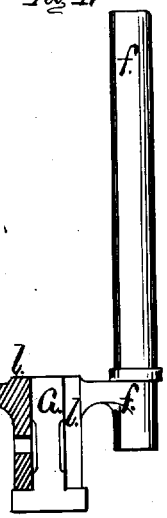
Fig. X.
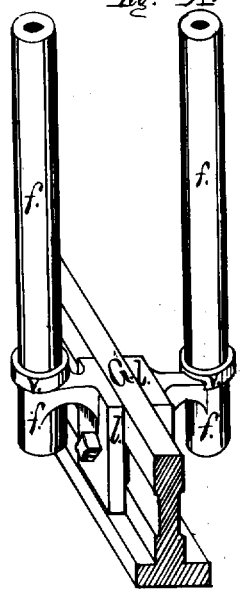
Fig. VIII
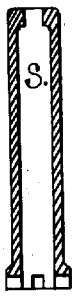
Fig. IX.
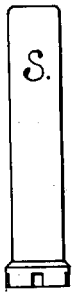
Fig. VI
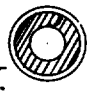
Fig. V.
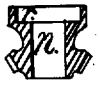
Fig. V.
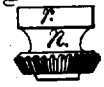
Witnesses
L. P. Langworthy
Chas. F. Hunt
Inventor
Thomas Mayor
by
Joseph A. Miller
his Attorney.

UNITED STATES PATENT OFFICE.

THOMAS MAYOR, OF PROVIDENCE, RHODE ISLAND.

IMPROVEMENT IN ROVING-FRAMES.

Specification forming part of Letters Patent No. 43,530, dated February 21, 1865; reissue No. 1,950, dated May 9, 1865; reissue No. 6,302, dated February 23, 1875; application filed May 14, 1874.

*To all whom it may concern:*

Be it known that I, THOMAS MAYOR, formerly of Pawtucket, in the county of Providence, but now of the city of Providence, in the State of Rhode Island, have invented a new and useful Improvement in Roving-Frames for Spinning Roving; and I do hereby declare that the following is a full, clear, and exact description of the same, reference being had to the accompanying drawings making part of this specification, in which—

Figure I is an elevation of the spindle-bolster and appendages. Fig. II is a vertical section of one of the spindles and bolster. Fig. III is a vertical section of the improved bolster. Fig. IV is an elevation of the same. Fig. V is a vertical section of the gear and collar for revolving the bobbin. Fig. VI is an elevation, and Fig. VII is a plan, of the same. Fig. VIII is a vertical section of the bobbin. Fig. IX is an elevation of the same. Fig. X shows the improved bolster secured to the rail G, in perspective view.

An end elevation of the roving-frame to which my improvement is applied is shown in dotted lines properly arranged in connection with Figs. I and II.

Similar letters of reference indicate corresponding parts in all the figures.

My invention consists in so constructing the bolster, or the part that forms the upper bearing to the spindle of roving-frames, that the bearing will be near the top of the bobbin, and that the bolster-tube which forms this bearing shall be made in one piece with the bracket by which the same is secured to the side of the reciprocating traverse-rail, without any intermediate joints, sockets, or screws, and thereby give a firm support to the spindle, and admit of its running with uniform steadiness and at high speed.

To enable others skilled in the art to make and use my invention, I will proceed to describe the same.

In the drawings, *a*, Figs. I and II, is the spindle, having one bearing in the step E, which is firmly secured to the stationary rail *d*, and another bearing near the top of the bobbin formed by the bolster-tube *f*. At the top of the spindle is secured the flier T, to revolve which is the office of the spindle, and by which the requisite twist of the roving is obtained, and the twisted roving is also wound on the bobbin.

The bolster *f* is constructed as shown in Figs. III and IV, and also in perspective in Fig. X, of one piece of metal, and consists in a tube or sleeve, *f*, surrounding the spindle, the upper interior portion of which forms the upper bearing of the spindle, while the exterior portion forms a bearing for the collar N and the bobbin S. This tube *f* has a bracket or standard, *l*, cast in one piece with it, by which it is firmly secured to the side of the traverse-rail G, as shown in Figs. I, II, III, IV, and X. This traverse-rail G has a vertical reciprocating movement, produced by the rack D, to which the rail G is connected by the arms *b*, and the pinion E, by its revolution in alternate opposite directions, raises and lowers the rail G, and with the same the bolster and bobbin.

The advantage of casting or forming the bolster and bracket or standard in one piece, as shown, and securing the same to the side of the traverse-rail consists, first, in giving to the whole great strength; second, the upper bearing for the spindle is readily adjusted so as to be perpendicular over the step, and the spindle runs true and with little friction; and, third, as neither set-screws nor lock-nuts are used to secure the tube, the same is not liable to work loose and shake or wabble. The cost of manufacture is also greatly reduced, as also the time required to set up a roving-frame.

I am aware that a long tube reaching to near the top of the bobbin has been used, such tube having either a bearing the whole length of the tube, or one bearing at the top and another near the bottom of the tube, or a single bearing only at the top of the tube; and such tubes have heretofore been secured to a separate foot-piece, either by a set-screw passing through the foot-piece and forced against the socket-piece of the tube, or by extending the tube through the foot-piece and turning a shoulder on the tube to rest on the foot-piece and a screw-thread on the lower end, and so securing the same by a nut to the said foot-piece, and the whole to the top of the traverse-rail.

A bolster-tube constructed in the above manner has the disadvantage of being made of several parts, all of which must be accurately fitted and firmly secured, which is costly, and no matter how well done, the screws or nuts are liable to work loose, which, by producing shaking and wabbling of the spindle and flier, not only injures the roving, but breaks the flier and ruins the machine. As soon as discovered, the whole frame must be stopped until the injury is repaired, thus causing loss to the manufacturer.

When a long bearing through the length of such a tube is used it becomes mechanically impossible to set the axis of the same on the true axis of the spindle and over the center of the step, as is evident from the fact that when such long bearings are used various contrivances have been resorted to and are used, which allow the step to move and accommodate itself to the true axis of the spindle. All such loose parts are objectionable, as, by causing friction and wear, they increase the power required to drive the machinery, and cause constant repairs.

Another objection to the long bearing in the bolster-tube is that the lubricating-oils will gum, and the fine dust always in the atmosphere of a mill, mixing with the oil, causes much friction in the long bearing. To overcome in some measure this defect a tube has been constructed with two bearings—one at the top and the other at the bottom—leaving a space between the two slightly larger than the spindle. For a short time this avoids the gumming and sticking of the spindle; but such space can only be slight, and, being closed at the bottom, soon fills up, while the three bearings—one on top of the tube, one at its bottom, and the other in the step—are liable to the same difficulty for true adjustment as the long bearing.

I am also aware that bolsters have been constructed having the bracket *l*, and the bearing for the spindle at *f*, and carrying the gear *n;* but such bolsters supported the spindle near its middle, and spindles so supported and extending such a long distance above the bearing, and carrying the flier at their upper end, cannot be run at high speed, and cannot produce even any fine roving, as the flier is liable to shake and wabble, and not revolve evenly in a true concentric path around the bobbin, whereas with the bolster herein shown the spindle is supported near its top, and may be run at high speed, and produces a finer and more even roving than can be produced with spindles not so supported.

As it is evident that the nearer to the upper end of the bobbin the bearing for the spindle is placed the better must be the result, so it is evident that in proportion as the bearing is brought nearer to this upper end of the bobbin so must the final result be approximately obtained. Placing the bearing, therefore, at any point above the base of the bobbin produces greater steadiness in the spindle than when the bearing is placed below the base of the bobbin, for it must be remembered that the uniform winding of the roving on the bobbin without the slightest variation in the tension is necessary to produce a uniform and fine article, particularly when the frame is to run at high speed, which is very desirable, as the same number of spindles produce a much larger amount of roving in a given time.

When the bolster-tube and bracket are made in one piece, the attendant is relieved of much of the care and anxiety incident to the liability of bolster-tubes getting loose, and not only producing uneven work, but causing the roving to break, which necessitates the stoppage of the frame.

I, therefore, do not wish to confine myself to the bolster-tube made in one piece with the bracket, and supporting the spindle near its top only; but

I claim as my invention, and desire to secure by Letters Patent—

The long bolster, adapted to extend above the base of the bobbin, having a bearing for the spindle near its top, and made in one piece with a bracket, by which it may be secured to the side of the rail G, substantially as and for the purpose described.

THOMAS MAYOR.

Witnesses:
SAML. W. REED,
JOSEPH A. MILLER.